United States Patent
Arbuckle et al.

(10) Patent No.: US 9,353,208 B2
(45) Date of Patent: May 31, 2016

(54) METHOD FOR PREPARING A SOL-GEL RESIN

(71) Applicant: Hexion Inc., Columbus, OH (US)

(72) Inventors: Stephen W. Arbuckle, Louisville, KY (US); Gabriele Badini, Iserlohn (DE); John Huggins, Leverkusen (DE); Sanjay Gangal, Louisville, KY (US)

(73) Assignee: HEXION INC., Columbus, OH (US)

( * ) Notice: Subject to any disclaimer, the term of this patent is extended or adjusted under 35 U.S.C. 154(b) by 0 days.

(21) Appl. No.: 14/259,884

(22) Filed: Apr. 23, 2014

(65) Prior Publication Data

US 2014/0323680 A1    Oct. 30, 2014

Related U.S. Application Data

(60) Provisional application No. 61/815,401, filed on Apr. 24, 2013.

(51) Int. Cl.
| C08G 8/24 | (2006.01) |
| C08J 3/12 | (2006.01) |
| C08G 8/22 | (2006.01) |

(52) U.S. Cl.
CPC ... *C08G 8/24* (2013.01); *C08J 3/12* (2013.01); *C08J 2361/08* (2013.01); *C08J 2361/12* (2013.01)

(58) Field of Classification Search
CPC ........................................................... C08G 8/24
USPC ................................................... 528/144, 155
See application file for complete search history.

(56) References Cited

U.S. PATENT DOCUMENTS

| 3,422,068 A | 1/1969 | Kreibich et al. |
| 4,061,620 A | 12/1977 | Gillern |
| 4,370,424 A | 1/1983 | Baumann |
| 4,373,062 A | 2/1983 | Brown |
| 5,508,341 A | 4/1996 | Mayer et al. |
| 6,815,137 B2 | 11/2004 | Hoshi et al. |
| 2011/0303880 A1 | 12/2011 | Mulik et al. |
| 2012/0286216 A1 | 11/2012 | Zhang et al. |
| 2013/0209348 A1 | 8/2013 | Ludvik et al. |
| 2014/0148560 A1 | 5/2014 | Qureshi et al. |
| 2014/0323681 A1 | 10/2014 | Arbuckle et al. |

*Primary Examiner* — Duc Truong

(57) ABSTRACT

Sol-gel resins can be prepared using one or two-step processes to produce small granules or pellets of resin that are easy to handle. The methods include agitating phenolic compounds and aldehydes in the presence of a catalyst and a solvent. The reactants are brought together over a period of time to avoid an undesirable buildup of heat within the reaction mass. Condensation of the material continues under agitation sufficient to knead the material as it gels. During this gelation, the material begins to form into smaller parts until particles, the shape of granules, are produced. The condensation continues to the degree that the material is no longer capable of sintering during packaging and storage. The material thus made can be easily discharged, packaged, portioned, and further processed.

26 Claims, 3 Drawing Sheets

Fig. 1 Invention
The exotherm is minimized by addition of the formaldehyde over a period of time.
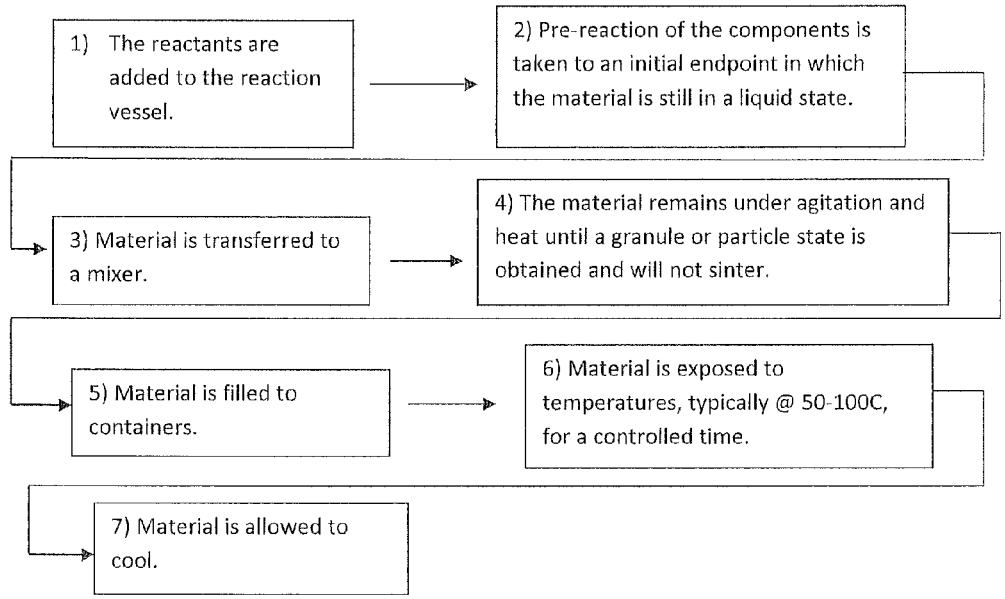
Fig. 2 Invention
The exotherm is minimized by addition of the formaldehyde over a period of time.
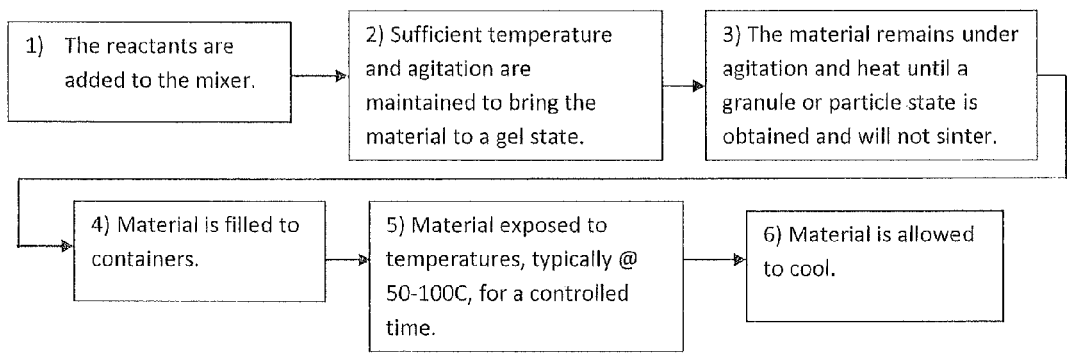

Fig. 3 Invention
The exotherm is minimized by addition of the formaldehyde over a period of time.
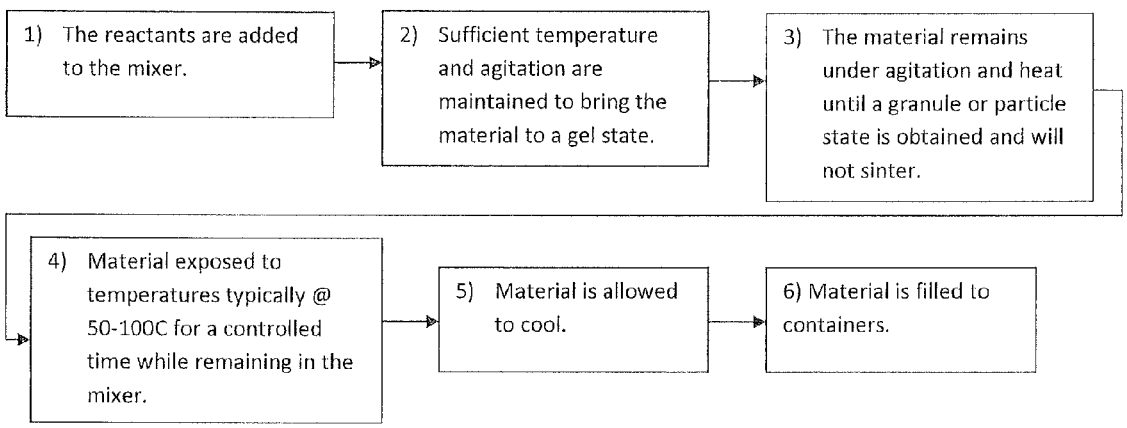

Fig. 4 Incremental pore volume as measured by BET
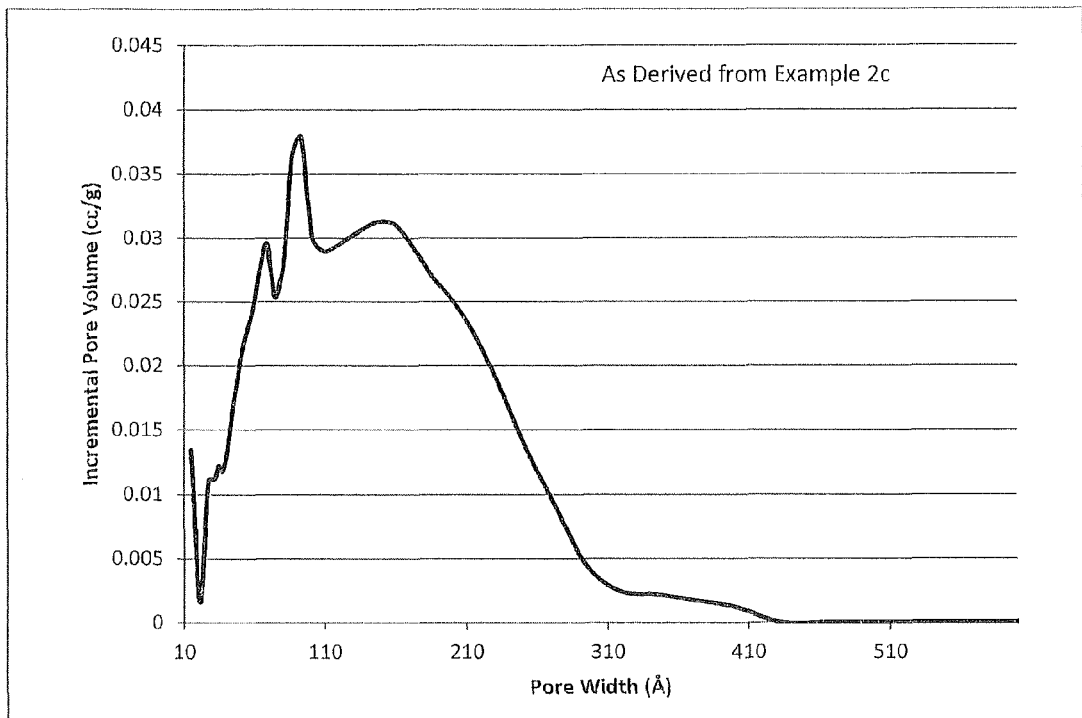

METHOD FOR PREPARING A SOL-GEL RESIN

RELATED APPLICATION DATA

This application claims benefit to U.S. Provisional Application No. 61/815,401, filed Apr. 24, 2013, of which the entire contents of the application are incorporated by reference herein.

BACKGROUND OF THE INVENTION

1. Field of the Invention

The invention relates to the production of resins. The invention particularly relates to the production of sol-gel resins.

2. Background of the Art

The production of sol-gel resins can be difficult due to the lack of control during the gelation of the polymers. The polymerization necessary to produce a sol-gel may result in a form difficult to process further. In conventional sol-gel polymerizations of phenols and aldehydes, it is often necessary to make small batches since current technology requires that the sol-gel be formed as a monolith that would require extensive handling. This can be undesirable in commercial applications where economy is often found in scale.

It would be desirable in the art to be able to produce large batches of phenolic aldehyde sol-gel resins. It would be particularly, desirable in the art to make such large batches. There continues to be a need in the art for new and improved methods for transforming the sol-gel from a monolith to a more suitable form for manufacture, packaging, and processing. The present invention fulfills these needs and provides further related advantages.

SUMMARY OF THE INVENTION

In one aspect, the invention is a method for preparing a sol-gel comprising: introducing a hydroxylated benzene (such as phenol, catechol, resorcinol, hydroquinone, and phloroglucinol), optionally catalyst, and optionally water into a reactor to form a catalyzed phenol; introducing into the reactor, with agitation, an aldehyde; maintaining the controlled reaction for period of time sufficient to consume a portion of the hydroxylated benzene to form a liquid resin precursor; transferring the resin precursor from the reactor into a mixer; and agitating the resin precursor for a period of time sufficient to form sol-gel particulates.

In another aspect, the invention is a method for preparing a sol-gel comprising: introducing a hydroxylated benzene, optionally catalyst, and optionally water into a mixer; introducing into the mixture, with agitation, an aldehyde; and maintaining the controlled reaction for a period of time sufficient to form sol-gel particulates.

In another aspect, the invention is a method for preparing a sol-gel resin comprising introducing a hydroxylated benzene and optionally a catalyst into a reactor; introducing an aldehyde into the reactor with agitation to form a reaction mixture; reacting the reaction mixture for a period of time sufficient to consume a portion of the hydroxylated benzene to form a liquid resin precursor; transferring the liquid resin precursor from the reactor into a mixer; and agitating the liquid resin precursor in the mixer for a period of time sufficient to form the sol-gel resin in a particulate form.

In another aspect, the invention is a method for preparing a sol-gel resin comprising: introducing a hydroxylated benzene and optionally a catalyst into a mixer; introducing an aldehyde into the mixer with agitation to form a reaction mixture; and agitating the reaction mixture for a period of time sufficient to form the sol-gel resin in a particulate form.

In another aspect, in the above methods, the introduction of aldehyde into the reactor or the mixer is over a period of time sufficient to control the reaction exotherm to a desired level. In another aspect, in the above methods, the reactor is configured to control the temperature of the material therein. In another aspect, in the above methods, the reaction exotherm is controlled for a period of time sufficient to consume more than above about 70%, or from about 70% to about 99%, or about 70% to an undetectable amount of the hydroxylated benzene, or for a period of time sufficient to consume about 30% to about 90% of the aldehyde.

In another aspect, in the above methods, the sol-gel resin is shaped into the desired geometry which does not sinter or agglomerate. In another embodiment the shaped sol-gel resin is cured at a temperature of from about 50° C. to about 100° C.

In another aspect, the above methods are free of a step to isolate the sol-gel resin from a suspending liquid reaction media. In another aspect the above methods are free of reaction phases that are immiscible or insoluble with each other.

BRIEF DESCRIPTION OF THE DRAWINGS

The advantages and further aspects of the disclosure will be readily appreciated by those of ordinary skill in the art as the same becomes better understood by reference to the following detailed description when considered in conjunction with the accompanying drawing(s) wherein:

FIG. 1, is a flow chart showing the method of a two-step process of the invention; this process does not result in a monolith and requires minimal further handling;

FIG. 2, is a flow chart showing the method of a one-step process of the invention; this process does not result in a monolith and requires minimal further handling;

FIG. 3, is a flow chart showing the method of preparing the invention entirely in the mixer, omitting the post-condensation in the oven; this alternative embodiment of the single step process does not result in a monolith and requires minimal further handling;

FIG. 4 is a graph illustrating certain physical properties of Example 2c.

DESCRIPTION OF THE PREFERRED EMBODIMENTS

For the purpose of the present application, the following terms are defined as follows:

"Acid" refers to any substance that is capable of lowering the pH of a solution.

"Base" refers to any substance that is capable of raising the pH of a solution.

"Catalyst" refers to a material which alters the reaction rate.

"Granular gel" refers to a sub-class of polymer gel wherein the sol gel was further condensed under agitation to the molecular weight wherein it has been formed into granules.

"Monolith" refers to a solid, three-dimensional structure that is not particulate in nature.

"Monomer" and/or "Polymer precursor" refers to the compounds used in the preparation of a polymer.

"Polymer" refers to a substance in which monomers are added to each other to form long-chain molecules.

"Pore" refers to an opening or depression in the surface, or a tunnel in a carbon material.

"Pore structure" refers to the layout of the surface of the internal pores within a material, such as an activated carbon. Components of the pore structure include pore size, pore volume, surface area, density, pore size distribution, and pore length.

"Surface area" refers to the total specific surface area of a substance often measurable by the BET technique which evaluates surface area by measuring the adsorption of gas molecules in a solid material relative to pressure. The porous structure of the sample was measured by nitrogen adsorption method using a Micromeritics TriStar II 3020. BET surface area was calculated by applying the BET (Brunauer-Emmett-Teller) theory. The micropore volume and micropore surface area was obtained by using the t-plot method. The total pore volume was calculated based on desorption isotherm at relative pressure of 0.99.

"Sintering" refers to a material's tendency to agglomerate into larger units wherein it may become difficult to process, requiring it to be crushed or ground by hand or mechanical means.

The invention pertains to polymer gels and methods for manufacturing the resins used to produce them. More specifically, the present invention pertains to those resins which are prepared from hydroxylated benzenes (such as phenol, catechol, resorcinol, hydroquinone, and phloroglucinol) and aldehydes (such as formaldehyde, furfural, glutaraldehyde, and glyoxal). This reaction is done in the presence of an acid and/or a base.

In the case of phenolic resins prepared from phenol-formaldehyde reactions (or the like, as previously described), the polymerization to form a polymer gel can be accomplished by reacting polymer precursors with or without the use of a catalyst and for a sufficient period of time to produce the polymer. This time will vary dependent upon the catalyst, amount of catalyst, temperature, and the monomers being used.

Typically reported methods for producing the resin gels include casting a solution of precursor materials into a container and allowing it to gel into a monolith, or by dispersing the reactant precursors in a suspension liquid medium where they gel to form particles.

It is desirable for the solid gel to be in a form which can easily be handled and processed, such as in particles or granules. Techniques for creating polymer gel particles from monolithic material include manual or mechanical means of size reduction such as grinding, milling, sieving, or combinations thereof. Various types of mills can be employed such as roller, bead, and ball mills and rotary crushers and similar particle creation equipment known in the art. The sieved particles are then stored in sealed containers until needed. The milling process can be costly and has an inherit concern regarding the dust generated.

Other methods for producing resin gels having desired particle size and particle size distribution include but are not limited to dispersion, emulsion and suspension polymerization methods. Such methods require a separation step to isolate the gel particles from the suspending liquid media and may be prone to a particle size distribution which is difficult to control.

A viable manufacturing process for making gelled particles having desired particle size and particle size distribution must overcome these and other limitations.

In one aspect, the current invention relates to a process for producing resin gel particles from a sol-gel reaction wherein the precursor reactants are agitated during the transition from liquid to solid phase in order that gel granules of desired particle size and particle size distribution are produced without the requirement of grinding or milling. In another aspect of the current invention, the gel granules of desired particles and particle size are produced without the use of reaction phases that are immiscible or insoluble with each other or with carrier fluids. In another aspect of the current invention, the gel granules of desired particles and particle size are produced without the requirement of a step to separate solids from liquid. In another embodiment the gel granules are produced without the need to isolate the gel granules from a suspending liquid media, and without the need for recycling of material in order to better control particle size distribution.

Sol Gel Granule Preparation

The sol gels may be prepared in a one or two-step process. The two step process comprises introducing a hydroxylated benzene (such as phenol, catechol, resorcinol, hydroquinone, and phloroglucinol), optionally catalyst, and optionally water into a reactor to form a mixture; introducing into the mixture, with agitation, an aldehyde; maintaining the controlled reaction for period of time sufficient to consume preferably at least 70% of the hydroxylated benzene to form a liquid resin precursor; transferring the resin precursor from the pre-reactor into a mixer; and agitating the resin precursor for a period of time and at a temperature sufficient to form sol-gel granules.

The single step process comprises introducing a hydroxylated benzene, optionally catalyst, and optionally water into a mixer; introducing into the mixture, with agitation, an aldehyde; and maintaining the controlled reaction for a period of time sufficient to form a sol-gel. In each of these examples, the material is permitted to polymerize until it has become a gel (polymer gel) and further mixed until particles are formed having the shape of granules. These granules are then further mixed until they are polymerized to the extent that they no longer possess sufficient "tack" to agglomerate. This stage is to assure there is no sintering during packaging, shipping, and storage. The material thus made is found to be free flowing from the manufacturing equipment and packaging. This eliminates the present practice of crushing by hand or mechanical means.

The catalysts useful with the method of the application can be either acidic and/or basic. In most embodiments of the application, the hydroxylated benzene and catalyst will be charged into a reactor in the presence of a solvent. In many embodiments, the solvent will be water. Other solvents useful with the methods of the application include but are not limited to ethanol, methanol, and isopropyl alcohol. In the practice of the methods of the application, an aldehyde is introduced into a hydroxylated benzene mixture. Any aldehyde known to those of ordinary skill in the art to be useful for making phenolic resins may be used with the method of the application. In some embodiments sufficient water is added to the reaction mixture to obtain a calculated solids content, based on the amounts of hydroxylated benzene components and aldehyde components, of about 10 to about 70%, or about 20 to about 60%, or about 20 to 40%.

When the aldehyde is introduced into the hydroxylated benzene mixture, it is introduced with agitation. In many embodiments, this agitation is the result of stirring. In addition to stirring the agitation can be accomplished by any means known to be useful to those of ordinary skill in the art. During the process of preparing a sol-gel resin using the methods of the application, the consistency of the reaction mass may go from being nearly as low in viscosity as water to the consistency of a very heavy dough and then finally to discrete particles or pellets. In one embodiment, the molar ratio of hydroxylated benzene components to aldehyde components: about 0.20 (i.e. 1:5) to about 0.75 (i.e. 1:1.3), about 0.35 (i.e. 1:2.9) to about 0.65 (i.e. 1:1.54), or about 0.45 (i.e. 1:2.2) to 0.55 (i.e. 1:1.82).

In some embodiments of the methods of the application, conventional stirring may be sufficient. Agitator design can aid in the formation of the desired particle size and also minimize the power requirements as the reaction progresses. However, in other embodiments, the agitation necessary to the methods may be too difficult to achieve using simple stirring. In these embodiments it may be more desirable to resort to kneading or even extrusion. Combinations of these methods of agitation may also be used.

At least one benefit of agitation is the distribution of heat from the reaction more evenly over the entire reaction mass. In the practice of the methods of the application, the agitation may be commenced at any point prior to the accumulation of heat to undesirable levels within the mixer or reactor.

In some embodiments of the method of the application, the rate of addition of the aldehyde is used as a tool to control the accumulation of heat. This period may vary as a function of the reactants used and the properties of the mixer or the reactor employed.

It is desirable in many embodiments to maintain the temperature of the reaction mass at 90° C. or less while in the mixer or the reactor. In general, it would be desirable to maintain the temperature of the reaction mass from about 25° C. to about 120° C. In some embodiments, the temperature range is from about 40° C. to about 80° C. In the practice of the methods of the application however, any temperature may be employed that produces a composition with desirable properties.

During the production of the sol-gel resin, the temperature of the reaction mass is controlled to affect the rate of gelation, and the pore structure. In at least one embodiment, this controlling of temperature is performed by the use of a cooling jacket, cooling coils, or other method of cooling the reactor or mixer being employed. In most of these embodiments, the fluid used within the cooling jacket or cooling coil will be either air or water. Other fluids may be used and still be within the scope of the claims of this application.

It is sometimes desirable when producing a sol-gel resin to allow the reaction mass to increase in temperature at the end of the reaction. To that end, during some embodiments of the method of the application, the temperature of the reaction mass is controlled up until at least 70% to about 100% of the hydroxylated benzene is consumed. After that point, the reaction mass is allowed to reach thermal equilibrium without further cooling. In other embodiments cooling is maintained until about 75% of the hydroxylated benzene is consumed. In still other embodiments, the percentages are from about 90% and 99%.

An alternative means of monitoring the course of the reaction includes monitoring the consumption of the aldehyde rather than the hydroxylated benzene. When this method is employed, it is desirable that the temperature be controlled for a period of time sufficient to consume from about 30% to about 90% of the aldehyde. In some embodiments it may be desirable to control the temperature for the period of time sufficient to consume from about 40% to about 70% of the aldehyde.

In marked contrast to conventional means of making such sol-gel resins, the methods of the application results in a particle or pellet. As compared to the monolithic products resulting from a conventional processes, which most often require pulverization prior to use, the resin particles produced by the methods of the application may be easily and safely handled. Typically, embodiments of the methods of the invention may be used to produce a resin having an average particle size of from about 0.5 mm to about 20 mm. In some applications however, the agitation being used can be controlled to produce particles of resin having different diameters.

In addition to the other advantages of the particles produced using the methods of the application, the resin particles may be formed into an article having a desired range of geometry. Also where desired, articles prepared from particles resulting from the methods of the application may be cured at a temperature ranging from about 50° C. to about 100° C. Sometimes it may be desirable to cure at temperatures ranging from about 80° C. to about 90° C.

In practicing the methods of the application, it may be desirable to polymerize the reactants in one step or two. In a two-step process, the aldehyde is introduced into the hydroxylated benzene mixture within a first reactor, and after at least 70% of the hydroxylated benzene has been consumed, transfer the reaction mass to a second vessel.

In an alternative embodiment, a single step process may be used wherein the entire reaction takes place in a single reactor. For the purposes of this application, the terms mixer or reactor are defined to include any device which is capable of carrying out the reaction, with agitation, and at temperatures sufficient to form a sol-gel resin. Further any method of mixing either within or outside of a reactor known to those of ordinary skill in the art may be employed with the application. Such methods employ agitators and mixers including but are not limited to dough kneaders, Sigma-Aldrich® mixers, twin-screw extruders, BUSS™ kneaders, and pelletizers, planetary mixers or Cowles Mixers such as, for example, those sold by Charles Ross & Son Co. of Hauppauge, N.Y. under the brand name PowerMix™ PDM and the like. Also useful may be cell-reactors such as those employed in U.S. Pat. No. 4,128,568 which is incorporated herein in its entirety by reference; mono- or twin-screw reactors such as those described in Plaste and Kautschuk 30 (1983) 181-185; and the like.

In some embodiments of the methods of the application, it is desirable to control the pressure of the reaction mass and to avoid the emission of reactants and/or solvents. In these embodiments, the reactor or mixer may be equipped with vacuum systems. Especially in embodiments where it is desirable to avoid the emission of vapors, the vacuum systems may include components to trap such emissions. One such component would be a reflux system. Any component useful to those of ordinary skill in the art for preventing or reducing the emission of undesirable compounds may be employed with or without the vacuum systems.

EXAMPLES

Example 1

Referring to FIG. 1, the gel was prepared from a mixture of acetic acid, ammonium acetate, water, phenol, resorcinol, and formaldehyde. Sufficient water was added in order to obtain calculated solids of 31.8%. The calculated solids value was based upon recipe amounts formaldehyde, phenol, and resorcinol. The formaldehyde was added to the other components in a reaction vessel over a period of 50 minutes at 60° C. The contents were held at 60° C. for 10 minutes after the formaldehyde addition had been completed. The material was cooled to 55° C. and condensed for 170 minutes to obtain a free formaldehyde value of about 6.8% and a free phenol value of about 7.1%. The material was transferred to a mixer where it remained under agitation with heating until a granular or particle state was obtained. The phenol, resorcinol:

formaldehyde ratio was 0.50. A resin thus made produced product granular in appearance, having free phenol of 7.05%, free formaldehyde of 6.75%. The material thus made was then transferred to a container and exposed to a temperature of 85° C. for 57 hours in order to bring the resin to cure. The free phenol was 0.08% and the free formaldehyde was 3.8%.

Example 2a

Referring to FIG. 2, the gel was prepared from a mixture of acetic acid, ammonium acetate, water, phenol, resorcinol, and formaldehyde. Sufficient water was added in order to obtain calculated solids of 29.1%. The calculated solids content was based upon recipe amounts formaldehyde, phenol, and resorcinol. The formaldehyde was added to the other components in a mixer over a period of 50 minutes at 60° C. The contents were held at 60° C. for 10 minutes after the formaldehyde addition was completed. The material was cooled to 55° C. and condensed for about 2.5 hours to obtain a free formaldehyde value of about 5% and a free phenol value of about 3.5% at which time a granular or particle state was obtained. The phenol, resorcinol: formaldehyde ratio was 0.50. A resin thus made produced product granular in appearance, having a free phenol value of 3.5%, and a free formaldehyde value of 4.9%. The material was then transferred to a container and exposed to a temperature of 85° C. for 60 hours to bring the resin to cure. No detectable free phenol was found and the free formaldehyde was 2.25%.

Example 2b

Also referring to FIG. 2, the gel was prepared from a mixture of acetic acid, ammonium acetate, water, resorcinol, and formaldehyde. Sufficient water was added in order to obtain calculated solids of 30.0%. The calculated solids value was based upon recipe amounts formaldehyde and resorcinol. The formaldehyde was added to the other components in a reaction vessel over a period of 50 minutes at 60° C. Ten minutes after the formaldehyde feed was completed, the material was cooled to 52° C. and condensed for 130 minutes. The material was then transferred to a mixer and condensed at 50° C. for 1 hour. The resorcinol:formaldehyde ratio was 0.5. A resin thus made produced product granular in appearance, having free formaldehyde of 3.4%. The material was then transferred to a container and exposed to a temperature of 85° C. for 50 hours in order to bring the resin to cure.

Example 2c

Further referring to FIG. 2. the gel was prepared from a mixture of acetic acid, ammonium acetate, water, resorcinol, and formaldehyde. Sufficient water was added in order to obtain calculated solids of 29.5%. The calculated solids value was based on recipe amounts formaldehyde and resorcinol. The formaldehyde was added to the other components over a period of 50 minutes at 60° C. and held another 10 minutes at 60° C. The material was cooled to 52° C. and condensed for 150 minutes. The resorcinol:formaldehyde ratio was 0.5. A resin thus made produced product granular in appearance. The material was then exposed to a temperature of 85° C. for 36 hours in order to bring the resin to cure. The resin particles thus made were freeze dried as is known in the art gave BET results as shown in FIG. 4.

Example 3

Referring to FIG. 3, the gel was prepared from a mixture of acetic acid, ammonium acetate, water, resorcinol, and formaldehyde. Sufficient water was added in order to obtain calculated solids of 29.5%. The calculated solids value was based upon recipe amounts formaldehyde and resorcinol. The resorcinol:formaldehyde ratio was 0.5. The formaldehyde was added to the acetic acid, ammonium acetate, water, and resorcinol in a mixer over a period of 50 minutes at 65° C. The mix was held at 65° C. for 10 minutes after the formaldehyde addition. It was then cooled to and condensed at 55° C. for 188 minutes. The temperature was then increased to 70° C. and held for 11 hours and 45 minutes. It was cooled to less than 30° C. and transferred to a container. A resin thus made produced product granular in appearance, having free formaldehyde of 1.8%.

We claim:

1. A method for preparing a sol-gel resin comprising:
    introducing a hydroxylated benzene and optionally a catalyst into a reactor;
    introducing an aldehyde into the reactor with agitation to form a reaction mixture;
    reacting the reaction mixture for a period of time sufficient to consume a portion of the hydroxylated benzene to form a liquid resin precursor;
    transferring the liquid resin precursor from the reactor into a mixer; and
    agitating the liquid resin precursor in the mixer for a period of time sufficient to form the sol-gel resin in a particulate form.

2. The method of claim 1 wherein the reactor is configured to control the temperature of material therein.

3. The method of claim 1 wherein the aldehyde is introduced into the reactor over a period of time sufficient to control a reaction exotherm.

4. The method of claim 3 wherein the reaction exotherm is controlled for the period of time sufficient to consume more than above about 70% of the hydroxylated benzene.

5. The method of claim 3 wherein the reaction exotherm is controlled for the period of time sufficient to consume from about 30% to about 90% of the aldehyde.

6. The method of claim 1 wherein the resin precursor is agitated in the mixer at a temperature maintained between about 25° C. to about 120° C.

7. The method of claim 6 wherein the temperature is maintained between about 40° C. to about 80° C.

8. The method of claim 1 wherein the molar ratio of hydroxylated benzene to aldehyde is about 0.20 to about 0.75.

9. The method of claim 1 wherein the resin precursor is agitated within the mixer under conditions sufficient to produce the sol-gel resin having an average particle size of from about 0.5 mm to about 20 mm.

10. The method of claim 1 further comprising shaping the sol-gel resin into a desired geometry that does not sinter or agglomerate.

11. The method of claim 10 wherein the shaped sol-gel resin is cured at a temperature of from about 50° C. to about 100° C.

12. The method of claim 1 free of a step to isolate the sol-gel resin from a suspending liquid reaction media.

13. The method of claim 1 free of reaction phases that are immiscible or insoluble with each other.

14. A method for preparing a sol-gel resin comprising:
    introducing a hydroxylated benzene and optionally a catalyst into a mixer;
    introducing an aldehyde into the mixer with agitation to form a reaction mixture; and
    agitating the reaction mixture for a period of time sufficient to form the sol-gel resin in a particulate form.

15. The method of claim 14 wherein the mixer is configured to control the temperature of material therein.

16. The method of claim 14 wherein the aldehyde is introduced into the mixer over a period of time sufficient to control a reaction exotherm.

17. The method of claim 16 wherein the reaction exotherm is controlled for the period of time sufficient to consume more than above about 70% of the hydroxylated benzene.

18. The method of claim 16 wherein the reaction exotherm is controlled for period of time sufficient to consume from about 30% to about 90% of the aldehyde.

19. The method of claim 14 wherein the resin precursor is agitated in the mixer at a temperature maintained between about 25° C. to about 120° C.

20. The method of claim 19 wherein the temperature is maintained between about 40° C. to about 80° C.

21. The method of claim 14 wherein a molar ratio of hydroxylated benzene to aldehyde is about 0.20 to about 0.75.

22. The method of claim 14 wherein the resin precursor is agitated within the mixer under conditions sufficient to produce the sol-gel resin having an average particle size of from about 0.5 mm to about 20 mm.

23. The method of claim 14 further comprising shaping the sol-gel resin into a desired geometry that does not sinter or agglomerate.

24. The method of claim 23 wherein the shaped sol-gel resin is cured at a temperature of from about 50° C. to about 100° C.

25. The method of claim 1 free of a step to isolate the sol-gel resin from a suspending liquid reaction media.

26. The method of claim 14 free of reaction phases that are immiscible or insoluble with each other.

* * * * *